United States Patent
Hatabe et al.

(10) Patent No.: US 9,183,038 B2
(45) Date of Patent: Nov. 10, 2015

(54) JOB MANAGEMENT SYSTEM THAT DETERMINES IF MASTER DATA HAS BEEN UPDATED, THEN RE-EXECUTES A SUB-JOB BASED ON AVAILABLE EXECUTING COMPUTERS AND DATA SHARING STATUS

(75) Inventors: Norichika Hatabe, Hiratuka (JP); Tsutomu Sugita, Yokohama (JP)

(73) Assignee: HITACHI, LTD., Tokyo (JP)

( * ) Notice: Subject to any disclaimer, the term of this patent is extended or adjusted under 35 U.S.C. 154(b) by 162 days.

(21) Appl. No.: 13/825,422

(22) PCT Filed: Nov. 10, 2010

(86) PCT No.: PCT/JP2010/070043
§ 371 (c)(1),
(2), (4) Date: Apr. 29, 2013

(87) PCT Pub. No.: WO2012/063339
PCT Pub. Date: May 18, 2012

(65) Prior Publication Data
US 2013/0219406 A1    Aug. 22, 2013

(51) Int. Cl.
*G06F 9/46*  (2006.01)
*G06F 9/50*  (2006.01)
*G06F 9/48*  (2006.01)

(52) U.S. Cl.
CPC .............. *G06F 9/46* (2013.01); *G06F 9/4881* (2013.01); *G06F 9/5038* (2013.01); *G06F 2209/484* (2013.01); *G06F 2209/5017* (2013.01)

(58) Field of Classification Search
None
See application file for complete search history.

(56) References Cited

U.S. PATENT DOCUMENTS

| 5,522,058 | A  | * | 5/1996  | Iwasa et al. ............... 711/145 |
| 5,592,945 | A  | * | 1/1997  | Fiedler ...................... 600/523 |
| 5,761,389 | A  | * | 6/1998  | Maeda et al. ............... 706/59 |
| 6,334,137 | B1 | * | 12/2001 | Iida et al. .................... 718/104 |
| 7,596,788 | B1 | * | 9/2009  | Shpigelman ................ 718/100 |
| 2002/0065835 | A1 | * | 5/2002 | Fujisaki ........................ 707/200 |
| 2004/0049531 | A1 | * | 3/2004 | Honda et al. ................. 709/201 |
| 2005/0010608 | A1 | * | 1/2005 | Horikawa ..................... 707/200 |
| 2007/0043869 | A1 |   | 2/2007 | Harabe |
| 2008/0037854 | A1 | * | 2/2008 | Grossman et al. ............ 382/135 |

FOREIGN PATENT DOCUMENTS

| JP | 09-016527 A    | 1/1997 |
| JP | 2000-148517 A  | 5/2000 |
| JP | 2000-194576 A  | 7/2000 |
| JP | 2002-014829 A  | 1/2002 |
| JP | 2006-277696 A  | 10/2006 |
| JP | 2007-052673 A  | 3/2007 |
| WO | 2007/108062 A1 | 9/2007 |

OTHER PUBLICATIONS

Sakai et al., "Automatic Parallelizing Method for Control-parallel Multi-threaded Architecture", 1998 Nen Joint Symposium on Parallel Processing, Jun. 3, 1998, pp. 383-390, vol. 98, No. 7.

* cited by examiner

*Primary Examiner* — Meng An
*Assistant Examiner* — Jorge A Chu Joy
(74) *Attorney, Agent, or Firm* — Mattingly & Malur, PC

(57) ABSTRACT

In a computer system of the present invention, whether or not master data has been updated is managed for each division key as master data management information. If the master data has been updated, a job is re-executed, but when the job is re-executed, data is divided using only a division key corresponding to updated master data, and thereby a sub-job which is a re-execution target is localized with the division key unit so as to re-execute a job.

17 Claims, 11 Drawing Sheets

FIG. 4

JOB NET INFORMATION MANAGEMENT TABLE

/100

| JOB ID | FINISH CODE ABNORMAL THRESHOLD VALUE | DIVIDED DATA MANAGEMENT INFORMATION IDENTIFIER | DIVISION NUMBER |
|---|---|---|---|
| JOB A | 4 | File1 | n |
| JOB B | 4 | File1 | n |
| JOB C | 4 | File1 | n |
| JOB D | 8 | - | |

Columns: 1001, 1002, 1003, 1004

FIG. 5

JOB INFORMATION MANAGEMENT TABLE

/110

| JOB ID | OUTPUT FILE SHARING INFORMATION | OUTPUT FILE DELETION INFORMATION | OUTPUT FILE NAME |
|---|---|---|---|
| JOB A | SHARED | KEEP | fileA.# |
| JOB B | UNSHARED | DELETE | fileB.# |
| JOB C | SHARED | DELETE | fileC.# |

Columns: 1101, 1102, 1103, 1104

FIG. 6

DIVIDED DATA MANGEMENT TABLE

120

| | 1201 | 1202 | 1203 | 1204 | 1205 |
|---|---|---|---|---|---|
| | DIVIDED DATA ID | JOB ID | SUB-JOB ID | EXECUTION SERVER ID | STATE |
| | 1 | JOB A | JOB00001 | SERVER 1 | NORMAL |
| | 1 | JOB B | JOB00101 | SERVER 1 | NORMAL |
| | 1 | JOB C | JOB00201 | SERVER 1 | NORMAL |
| | 2 | JOB A | JOB00002 | SERVER 1 | NORMAL |
| 1206 | 2 | JOB B | JOB00102 | SERVER 1 | ABNORMAL |
| | 2 | JOB C | | | |
| | 3 | JOB A | JOB00003 | SERVER 2 | NORMAL |
| | 3 | JOB B | JOB00103 | SERVER 2 | NORMAL |
| | 3 | JOB C | JOB00203 | SERVER 2 | ABNORMAL |
| | : | : | : | : | : |

FIG. 7

EXECUTION SERVER MANAGEMENT TABLE

130

| 1301 | 1302 | 1303 |
|---|---|---|
| SERVER ID | SERVER STATE | MULTIPLICITY OF VACANCY |
| SERVER 1 | NORMAL | 0 |
| SERVER 2 | NORMAL | 0 |
| SERVER 3 | NORMAL | 1 |
| : | : | : |

FIG. 8

MASTER DATA MANAGEMENT TABLE

| DIVIDED DATA ID | DIVISION KEY | UPDATE HISTORY | WHETHER OR NOT UPDATE HAS BEEN PERFORMED |
|---|---|---|---|
| 1 | aaaa | 2010/08/16 12:29:32 | NON-UPDATED |
| 2 | bbbb | 2010/08/17 10:14:51 | UPDATED |
| 3 | cccc | 2010/08/16 12:29:32 | NON-UPDATED |
| : | : | : | |

FIG. 13
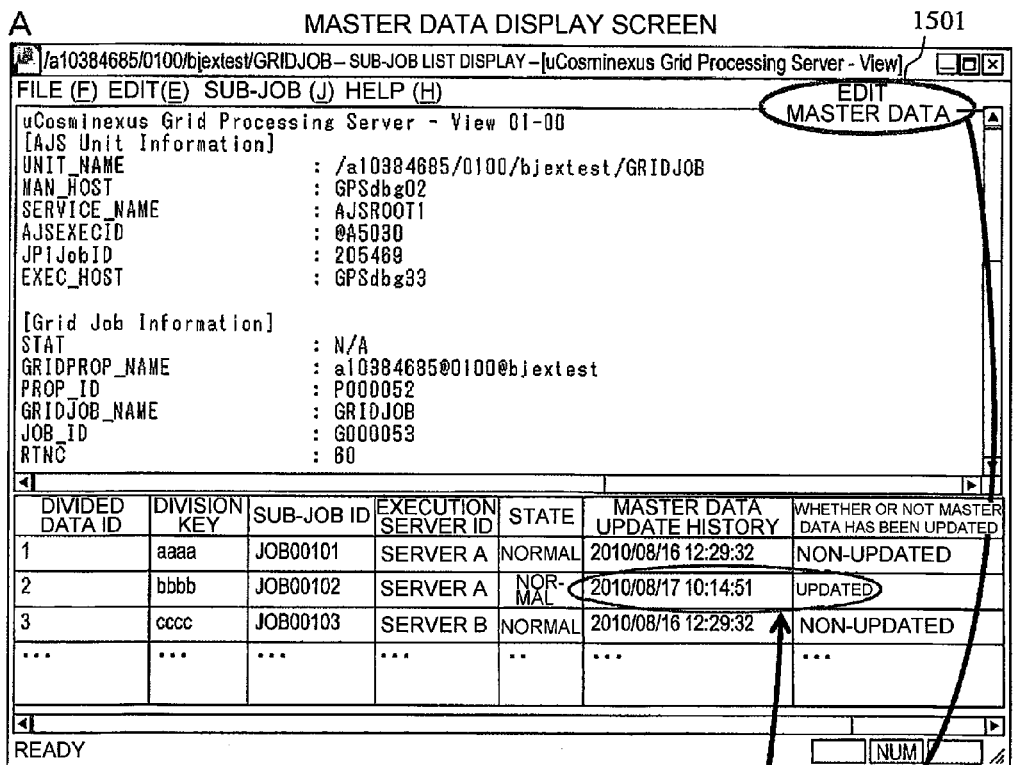
A  MASTER DATA DISPLAY SCREEN
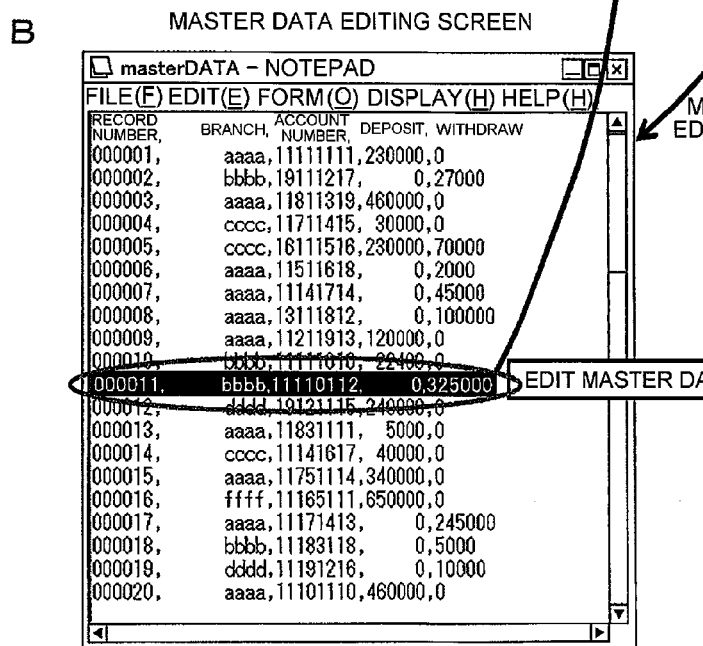
B  MASTER DATA EDITING SCREEN

JOB MANAGEMENT SYSTEM THAT DETERMINES IF MASTER DATA HAS BEEN UPDATED, THEN RE-EXECUTES A SUB-JOB BASED ON AVAILABLE EXECUTING COMPUTERS AND DATA SHARING STATUS

TECHNICAL FIELD

The present invention relates to a computer system, a job execution management method, and a program, and relates to, for example, a technique for controlling a job network.

BACKGROUND ART

A batch process is performed on mass data such as a daily or monthly process of finance and account records. In this batch process, it is important to guarantee a finish time. This is because, if the batch process does not finish, the start of a subsequent business service is disrupted. Therefore, the batch process requires high-speed for finishing even mass data in a predetermined time, reliability for a reliable finish, and rapid handling of failures. In addition, the batch process is also required to have a low costs and facilitated operations which are necessary to reduce Total Cost of Ownership (TCO).

In relation to these matters, for example, PTL 1 discloses a method (job scheduling method) of controlling a job net (also referred to as a job network) in which a plurality of batch jobs are correlated with each other in order to intensively control a lot of jobs and to easily monitor execution circumstances of jobs.

On the other hand, the job net is required to finish in a predetermined time in order to start a service which uses an execution result of the job net at a predetermined start time. However, since a process time of the batch job depends on an amount of data which is input and output, the job net cannot finish in a predetermined time if data increases. As a countermeasure for this, for example, PTL 2 discloses a job scheduling method in which data is divided, the divided data is assigned to each job so as to be processed in parallel on a plurality of computers, thereby speeding up a batch job process of mass data. In the job scheduling method of PTL 2, data is divided in advance, job definitions corresponding to the number of divisions are generated, and a relationship between the divided data and the job definition is recorded in a parallel process management table. A job which is to be executed is determined by referring to the parallel process management table when scheduling is performed, and a job definition including identification data of the job is provided to job management.

CITATION LIST

Patent Literature

[PTL 1] JP-A-2006-277696
[PTL 2] JP-A-2002-14829

SUMMARY OF INVENTION

Technical Problem

In the job net, there is a job net in which mass data is not processed in a single job, but the same data is processed in a plurality of jobs while reordering or processing the mass data and sending and receiving data between jobs.

However, in the job scheduling method of a job net in the related art including PTL 1, a relationship between the respective jobs for processing divided data of mass data is not defined, and an execution result or an execution place of a preceding job is not taken into consideration when data is assigned to a subsequent job. For this reason, in a case where some normal records related to a specific job are required to be updated and partially re-executed, it is necessary to perform a special operation in which the job net is executed again from the beginning, or another job is prepared, and only partial updated data is processed. Therefore, there is an increase in the risk of not being able to finish a job in a predetermined time due to an amount to be processed during re-execution being increased or a process being complex.

In addition, PTL 2 discloses a technique in which mass data is divided and is processed in parallel as described above, but does not disclose a job net. For this reason, a method of processing divided data on a job net and of increasing efficiency of a job is not taken into consideration.

The present invention has been made in consideration of these circumstances, and is to provide a job execution management technique of a job net capable of reducing a risk of exceeding a regulated estimated finish time in a case where a job is intended to be re-executed by updating some records related to one or a plurality of jobs in a job net.

Solution to Problem

In order to solve the above-described problems, in a computer system of the present invention, whether or not master data has been updated is managed for each division key as master data management information. If the master data has been updated, a job is re-executed, but when the job is re-executed, data is divided using only a division key corresponding to updated master data, and thereby a sub-job which is a re-execution target is localized with the division key unit so as to re-execute a job.

In addition, in the computer system, the master data may be updated after execution of the job or during the execution of the job. As described above, if the master data has been updated, a sub-job is re-executed, but in a case where divided data which is a target of the sub-job is specified, a division key corresponding to the updated master data is specified from information for determining whether or not the master data has been updated (a flag indicating whether or not update has been performed, histories (a correction history, a correction screen operation history, an SQL history, an operation for confirming an erroneous location from a job reference screen, and the like)), and whether or not an update has been performed for each division key is managed as master data management information.

In other words, the computer system according to the present invention includes a plurality of job execution computers that execute a job; a management computer that generates a plurality of divided data items by dividing master data using a division key indicating the division unit of the master data, and sets a job execution computer which applies a job net to each of the plurality of divided data items so as to execute a sub-job; and at least one storage device that stores at least the master data and an execution result of the sub-job. In addition, the management computer manages update related information regarding whether or not the master data has been updated and updated division key information which is a division key corresponding to an updated portion. Further, the management computer specifies a divided data item corresponding to the updated division key information from the plurality of divided data items when the master data is updated after execution of the sub-job or during the execution of the sub-job. Furthermore, the management computer instructs the job execution computer to apply the job net only on the divided data items which has been specified so as to re-execute a sub-job. In addition, the job execution computer re-executes the sub-job only on the divided data item which has been specified in response to the sub-job execution instruction from the management computer.

Advantageous Effects of Invention

According to the present invention, in a case where master data has been updated, only a specific sub-job can be re-executed with the division key unit, and thereby it is possible to guarantee a finish time of all jobs and improve efficiency of a job execution process.

In addition, objects, configurations, and effects other than described above will become apparent through the following embodiments of the present invention and the accompanying drawings.

BRIEF DESCRIPTION OF DRAWINGS

FIG. 4 is a diagram illustrating a configuration example of a job net information management table 100.

FIG. 5 is a diagram illustrating a configuration example of a job information management table 110.

FIG. 6 is a diagram illustrating a configuration of a divided data management table 120.

FIG. 7 is a diagram illustrating a configuration example of an execution server management table 130.

FIG. 8 is a diagram illustrating a configuration example of a master data management table 140.

FIG. 13 is a diagram illustrating a master data display screen example (FIG. 13A) and a master data editing screen example (FIG. 13B).

DESCRIPTION OF EMBODIMENTS

Figure 1:
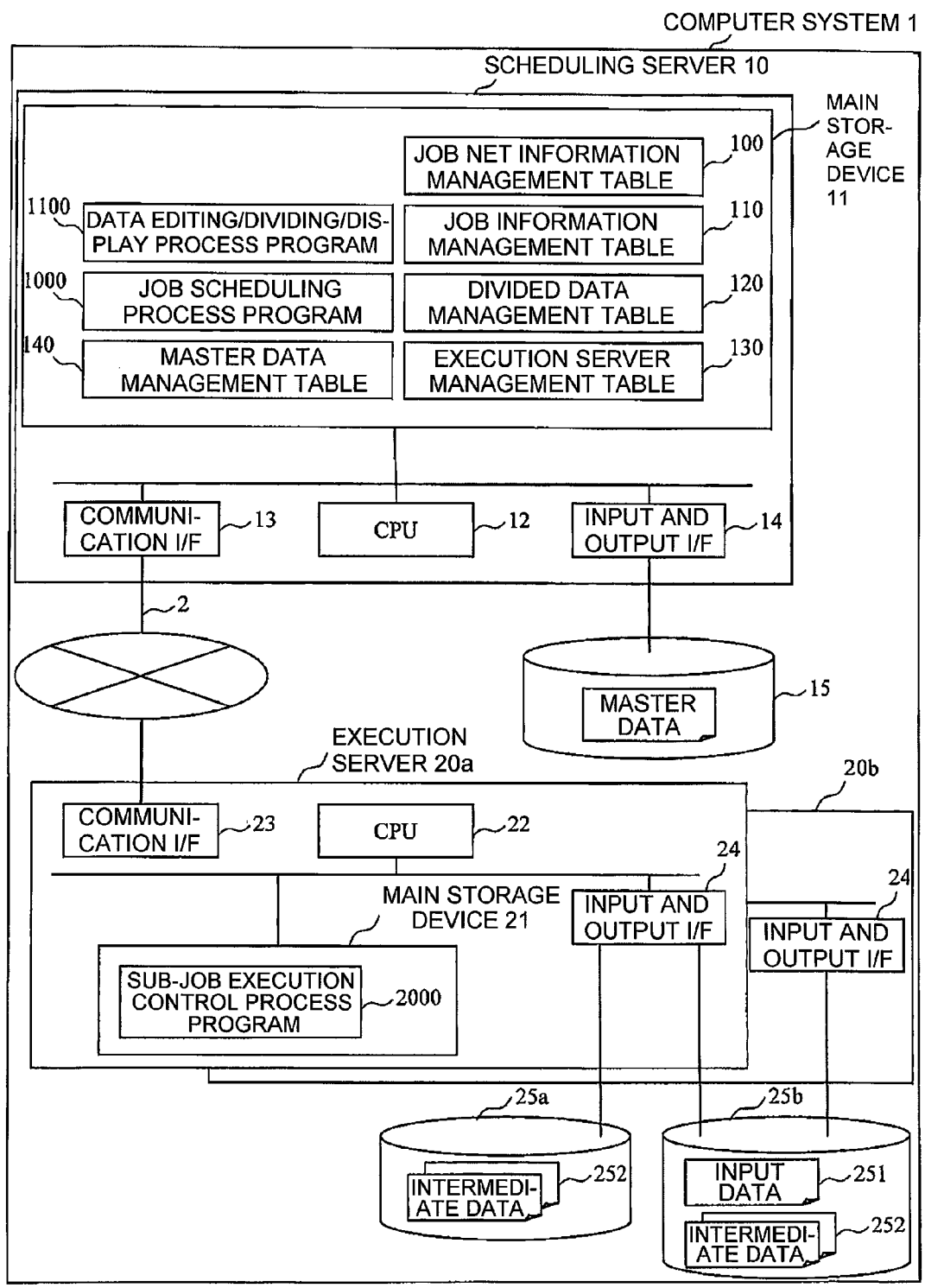
FIG. 1 is a diagram illustrating a configuration example of the computer system according to an embodiment of the present invention.

Hereinafter, embodiments of the present invention will be described with reference to the accompanying drawings. However, it is noted that the present embodiment is only an example for realizing the present invention and is not intended to limit the technical scope of the present invention. Further, in each drawing, a common constituent element is given the same reference numeral.

In addition, in the following description, information of the present invention is described using the term "table"; however, the information may not be necessarily expressed in a data structure using a table, may be expressed in a data structure such as a list, a DB, or a queue, or may be expressed in other structures. Therefore, in order to show independence from a data structure, a "table", a "list", a "DB", or a "queue" may be merely referred to as "information".

In addition, when content of each piece of information is described, the term "identification information", "identifier", "title", "name" or "ID" may be used, and they can be replaced with each other.

In the following, a description will be made using a "program" as a subject; however, the program is executed by a processor and performs a defined process using a memory and a communication port (communication control device), and thus a description may be made using the processor as a subject. In addition, the "program" may be replaced with a "module". Further, a process which is disclosed using a program as a subject may be a process which is performed by a computer such as a management server, or an information processing apparatus. A part of or an overall program may be realized by dedicated hardware or may be realized by modules. A variety of programs may be installed in each computer by a program distribution server or a storage medium.

<Configuration of Computer System>

FIG. 1 is a diagram illustrating a hardware configuration of a computer system 1 according to an embodiment of the present invention. The computer system 1 includes a scheduling server (also referred to as a management server or a management computer) 10 which executes a management process of a job such as a scheduling process of a job, and at least one execution servers 20a to 20n (also referred to as execution servers (job execution computers) 1 to n) which receive an instruction from the scheduling server 10 and execute sub-jobs of one or more jobs forming a job net, and they are connected to each other via a network 2. In addition, the scheduling server 10 is connected to a storage device 15 which stores master data. Further, here, the job net refers to a set of a series of jobs of which an execution order is defined and which is executed according to the execution order by a single scheduling request. In the job net, a previous (particularly, immediately previous) job in an execution order of the jobs is defined as a preceding job, and a subsequent (immediately subsequent) job is defined as a following job. In addition, the sub-job refers to a unit of each job forming the job net with respect to divided data generated by dividing master data which is a process target. Since data processed in a job is divided and is assigned to each sub-job, divided data items which are process targets are different but content of processing data is the same in a sub-job generated from the same job.

The scheduling server 10 includes a main storage device 11 which stores a variety of information and process programs, a Central Processing Unit (CPU) 12 which practically analyzes and executes a code of a process program or executes each of other processes, a communication interface (I/F) 13 for communication with the execution servers 20a to 20n, and an input and output interface (I/F) 14 for executing reading and writing of data from and in the storage device 15 connected to the scheduling server 10.

The main storage device 11 of the scheduling server 10 stores a job scheduling process program 1000 for executing a job scheduling process described later, a data editing/dividing/display process program 1100, a job net information management table 100 for managing information of each job forming a job net, a job information management table 110 for managing a feature of an output file of each job, a divided data management table 120 for managing each divided data item which is a process target of a sub-job, an execution server management table 130 for managing a state of the execution server, and a master data management table 140 for managing update circumstances of master data. In addition, in the present embodiment, the job scheduling process program 1000 instructs the data editing/dividing/display process program 1100 to execute a data editing, dividing or display process of an execution result of each sub-job or master data. In addition, the data editing/dividing/display process program 1100 may be provided in each execution server, and the execution server may execute dividing, displaying and editing processes of master data. In this case, the execution server 20 which executes a job should have master data.

Each of the execution servers 20a to 20n includes a main storage device 21 which stores a variety of information and process programs, a Central Processing Unit (CPU) 22 which practically analyzes and executes a code of a process program or executes each of the other processes, a communication interface (I/F) 23 for communication with the scheduling server 10, and an input and output interface (I/F) 24 for executing reading and writing of data from and in storage devices 25a and 25b connected to the scheduling server 10.

The main storage device 21 stores a sub-job execution control process program 2000 which controls execution of a sub-job described later.

The storage device 25b stores, for example, an input data file 251 which is an input of a leading job (for example, a job A in FIG. 2) of a job net, and an intermediate data file 252 which is output data of each job of the job net. In addition, the storage device 25a stores, for example, the intermediate data file 252 which is output data of each job. The input data file 251 may be a single file or may be a divided file into which a file is divided for each sub-job in advance. The intermediate data file 252 is generated for each sub-job.

The network 2 may employ an IP network, a storage network, any other kind of network for data communication, and the like.

<Job Net Execution Outline>

Figure 2:
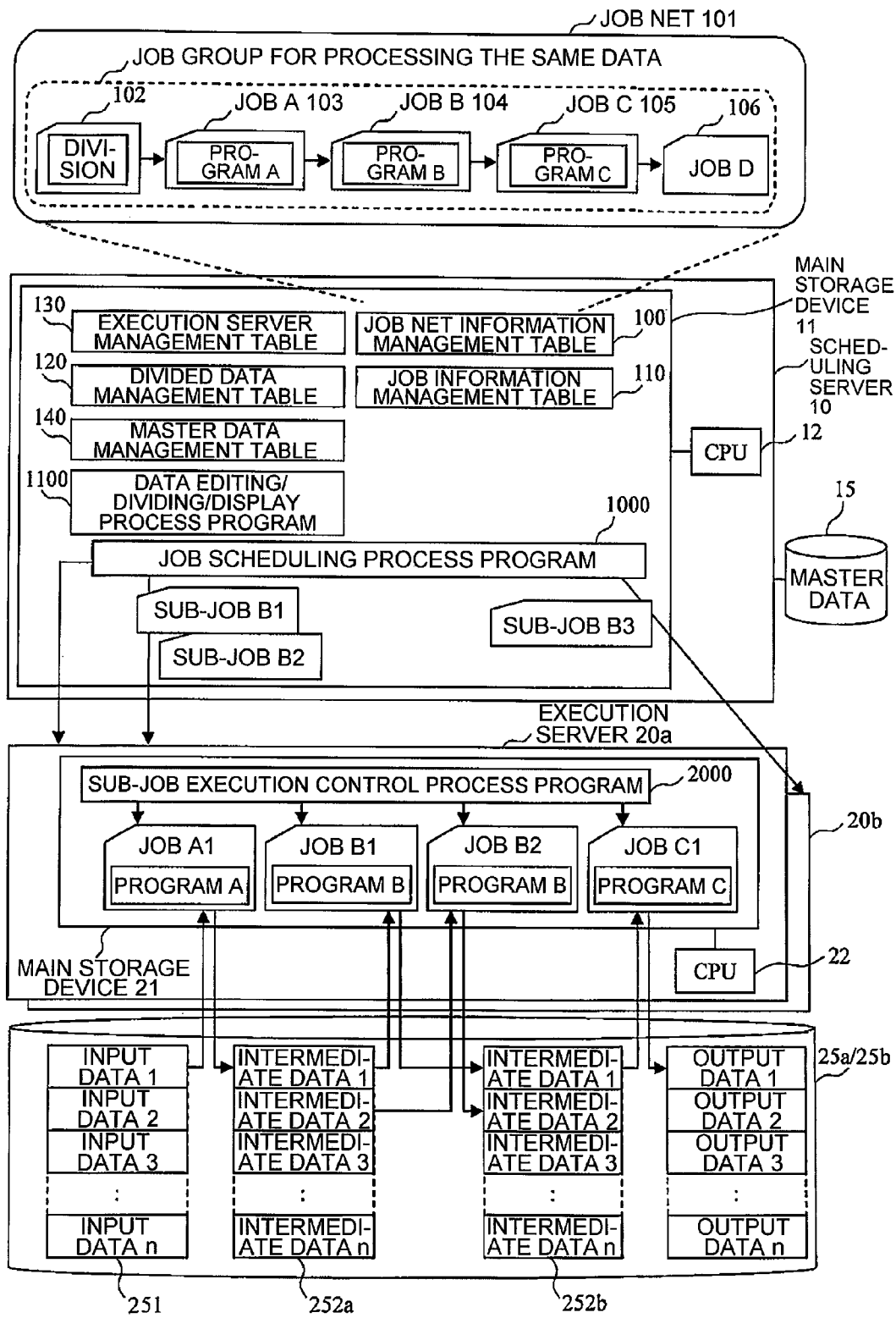
FIG. 2 is a diagram illustrating an outline (example) of a process of a job net executed in a computer system 1 according to the present embodiment.

FIG. 2 is a diagram illustrating an outline (example) of a process of a job net executed in the computer system 1 according to the present embodiment.

Here, for example, a job net 101 formed by five jobs (a division job 102, a job A 103, a job B 104, a job C 105, and a job D 106) is assumed to be defined in the job net information management table 100. In addition, in the job net, an intermediate data file 252 which is an output of the job A 103 is an input of the job B 104, and an intermediate data file 252 which is an output of the job B 104 is an input of the job C. In other words, the same divided data items which are generated through division of the input data file 251 of the job A 103 in the division job 102 are assumed to be processed over three jobs including the job A 103, job B 104 and job C 105. For example, the job A may be set to a process of changing daily data to monthly data, the job B may be set to a process of sorting the monthly data in a predetermined condition, the job C may be set to a process of printing personal data, and the job D may set to a process of combining process results.

When the job net 100 is executed, the job scheduling process program 1000 generates the divided data management table 120 and the execution server management table 130 on the basis of information of the job net information management table 100 and information of the job information management table 110 inside the main storage device 11, and requests any one of the execution servers 20a to 20n which can execute a job (multiplicity of vacancies is not "0", that is, there is a capacity for processing a job) to execute a sub-job 204.

The sub-job execution control process program 2000 of the execution server (for example, the execution server 20a) which is requested to execute the sub-job executes a sub-job on each divided data item according to an execution order of jobs forming the job net, determined through a job scheduling process. FIG. 2 shows an example in which the execution server 20a is assigned jobs so as to execute a sub-job A1, a sub-job B1, a sub-job B2, and a sub-job C1.

First, the master data is divided into a plurality of divided data items (input data items 1 to n 251) by the data editing/dividing/display process program 1100. The execution server receives a plurality of divided data items which are process targets from the scheduling server 10. Alternatively, in a case where the data editing/dividing/display process program is provided in each execution server and master data is stored in the storage device 25 of the execution server side, each execution server divides the master data. In addition, the sub-job execution control process program 2000 processes the input data 1 through the sub-job A1 (the job A=program A) so as to generate intermediate data 1_252a. Further, the sub-job execution control process program 2000 processes the intermediate data 1_252a through the sub-job B1 (the job B=program B) so as to generate intermediate data 1_252b. Simultaneously, the sub-job execution control process program 2000 processes the intermediate data 2_252a through the sub-job B2 (the job B=program B) so as to generate intermediate data 2_252b. In addition, the sub-job execution control process program 2000 processes the intermediate data 1_252b through the sub-job C1 (the job C=program C) so as to generate output data 1. Although, in the example shown in FIG. 2, the sub-jobs A to C are executed only on the input data 1, and only the sub-job B is executed on the intermediate data 2, the sub-job A and the sub-job C of the input data 2 or respective sub-jobs of other input data are executed in the other execution servers 20.

In addition, process results obtained by the respective execution servers 20 may be combined in the job D 106. Further, in the computer system 1, a plurality of scheduling servers (management servers or management computers) 10 may be installed, and process results of the division job and the jobs A to C executed in the respective scheduling servers may be finally processed in the job D of any one scheduling server 10.

<Conception of Re-Execution>

Figure 3:
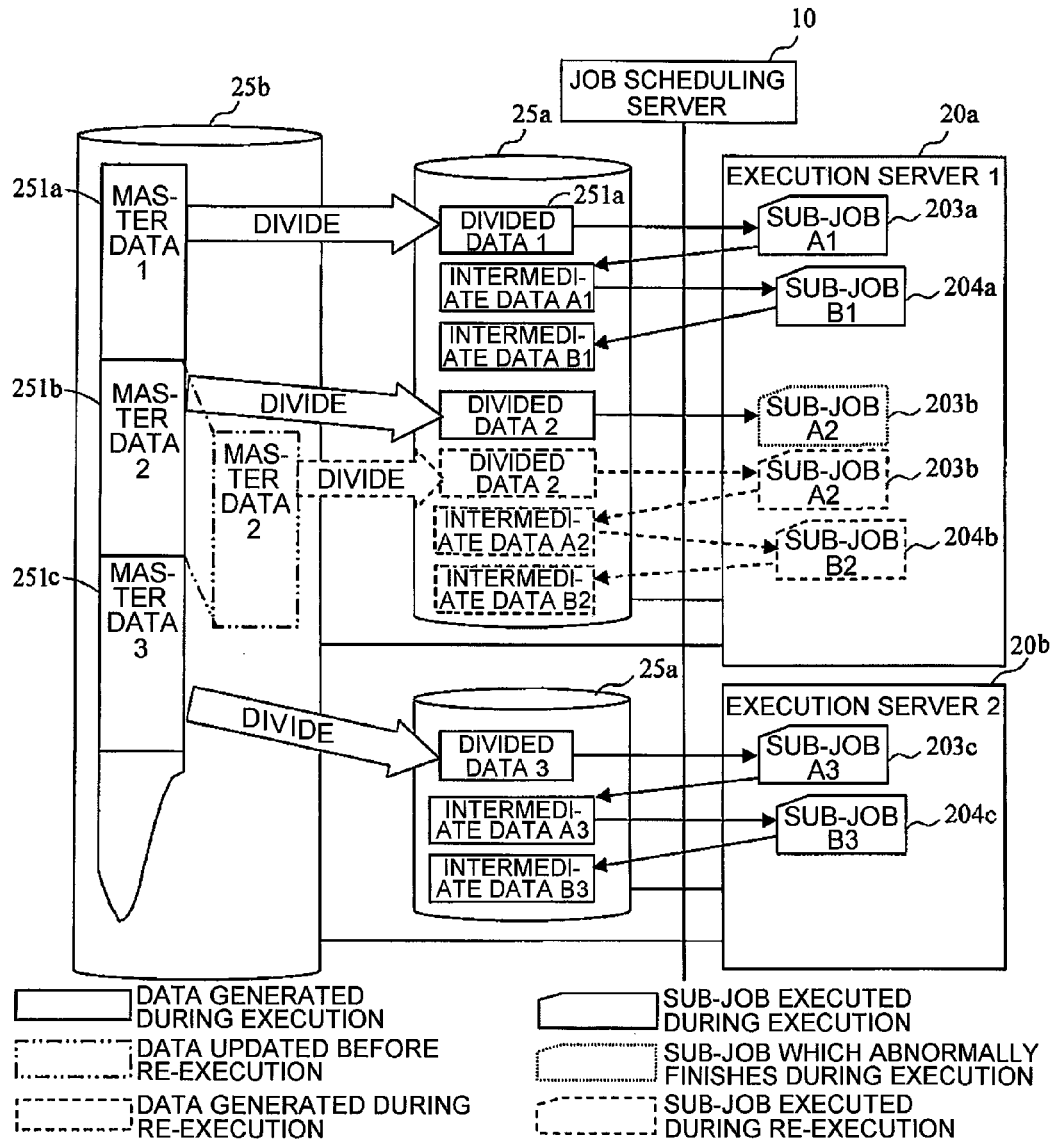
FIG. 3 is a diagram illustrating a conception of re-execution of a sub-job.

FIG. 3 is a diagram illustrating a conception of re-execution of a sub-job. FIG. 3 shows a state in which a sub-job A2 is re-executed in a case where the sub-job A2 (the job A for the divided data 2) is executed on the divided data 2, and, then, master data 2 (corresponding to the divided data 2) is updated, or the sub-job A2 finishes abnormally.

In FIG. 3, sub-jobs A1 and B1 are executed on the divided data 1, and intermediate data items A1 and B1 are generated normally. In addition, similarly, the divided data 3 also finishes normally. However, it is assumed that, in relation to the divided data 2, execution of the sub-job A2 finishes abnormally (for example, due to failures in the server), or the master data 2 (corresponding to the divided data 2) is updated during execution of the sub-job A2. Therefore, a process result (intermediate data) of the sub-job A2 (the sub-job 2 surrounded by the short dotted line) on the divided data 2 (the divided data 2 surrounded by the rectangular solid line) cannot be used for subsequent processes. For this reason, in this case, the sub-job is re-executed on the divided data 2. In the present invention, since each sub-job is managed and executed for each sub-job even in the job net configuration, a sub-job may be executed again on only divided data including the updated portion or divided data which was a process target of abnormal finish.

For example, in FIG. 3, the updated master data 2 is indicated by the two-dot chain line. In this case, the sub-job A2 is re-executed on the divided data 2 which has been updated (the divided data 2 surrounded by the rectangular dotted line). The sub-job A2 is executed on the divided data 2 updated (the divided data 2 surrounded by the long dotted line) through the re-execution (the trapezoidal dotted line) of the sub-job A2, and thereby intermediate data A2 is generated. In addition, the sub-job B2 is executed on the intermediate data A2, and thereby intermediate data B2 is generated. Since there is neither an abnormal process during the re-execution nor update of date in the middle of the process, the sub-job process finishes normally.

In addition, update of a master file is executed, for example, in a case where a manager rewrites the master file since there are errors in values of registered master data. Since whether or not the master data has been updated is managed in the master data management table 140 as described later, the execution server 20 can detect whether or not the update has been performed through communication with the scheduling server 10.

<Job Net Information Management Table>

FIG. 4 is a diagram illustrating a configuration example of the job net information management table 100. The job net information management table 100 includes a job ID 1001, a finish code abnormal threshold value 1002, a divided data management information identifier 1003, and a division number 1004, as constituent items.

The job ID 1001 is information for specifying a job forming a job net. Jobs described in the column of the job ID 1001 are executed in order, for example, from the top.

The finish code abnormal threshold value 1002 is information indicating whether a process finishes without transferring to a subsequent process in a case where a value of finish code shown as a result of executing a job specified by a job ID is predetermined value or more. Typically, values of the finish code are 0 to 255, and a greater value indicates that a serious failure occurred.

The divided data management information identifier 1003 is information for specifying a file name of original master data which is an execution target of a job and is divided.

The division number 1004 is information indicating a division number of master data, that is, a value indicating the number of sub-jobs.

In addition, here, the divided data management information identifier 1003 of the job D is N/A(–), and thus the column of the division number 1004 is blank. This is because, for example, in a case where the job D is a process or the like of combining job execution results by all or some scheduling servers 10 of the computer system 1, it is not necessary to divide and manage a specific file.

<Job Information Management Table>

FIG. 5 is a diagram illustrating a configuration example of the job information management table 110. The job information management table 110 includes a job ID 1101, an output file sharing information 1102, an output file deletion information 1103, and an output file name 1104, as constituent items.

The job ID 1101 is information for specifying a job forming a job net.

The output file sharing information 1102 is information indicating whether or not an intermediate data file which is a result of a corresponding job is a file which can be processed by other servers. In other words, in the column of the output file sharing information 1102, "shared" is stored when an intermediate data file which is an output file of a sub-job is output to a storage device (for example, the storage device 25*b*) shared between a plurality of execution servers, and "unshared" is stored when an intermediate data file is output to a storage device (for example, the storage device 25*a*) which is not shared between a plurality of execution servers. For example, the output file sharing information 1102 of the job A is set to "shared", which means that the job A is executed, an intermediate data file is output and the intermediate data file can be accessed by any execution server and be thus processed. If "shared" is set, it can be determined whether or not another job is executed on the intermediate data file of the job A by an execution server where there is a vacancy, even if failures occur in the execution server which has executed the job A. As such, in a case of being set to "shared", an intermediate data file can be accessed by other execution servers even if failures occur in a corresponding execution server. In addition, in a case of being set to "unshared", an intermediate data file cannot be accessed if failures occur in a corresponding execution server; however, it is considered that the file may be output to an unshared storage device by prioritizing a performance during execution when a job process is relatively small and time required for re-execution is small.

The output file deletion information 1103 is information indicating whether after an intermediate data file is output, the intermediate data file is kept or deleted. In a case where a following sub-job to which the intermediate data file is input finishes, "DELETE" is stored when the intermediate data file is deleted, and "KEEP" is stored when it is not deleted.

The output file name 1104 is information indicating a file name of an intermediate data file which is a job execution result. # in the output file name 1104 indicates # is replaced with a divided data ID. To append a divided data ID to the output file name is because each of intermediate data file is required to be identified since an intermediate data file is generated for each divided data ID.

In addition, the output file sharing information 1102 and the output file deletion information 1103 are also referred to in order to determine whether or not an intermediate data file can be accessed in a case where a sub-job is re-executed.

<Divided Data Management Table>

FIG. 6 is a diagram illustrating a configuration of the divided data management table 120. The divided data management table 120 is provided for each master data item, and FIG. 6 shows a divided data management table regarding File 1.

The divided data management table 120 includes a divided data ID 1201, a job ID 1202, a sub-job ID 1203, an execution server ID 1204, and a state 1205, as constituent items.

The divided data ID 1201 is identification information for specifying divided data items generated by dividing master data (for example, File 1) into n data items.

The job ID 1202 is information for specifying a job (sub-job) assigned to corresponding divided data.

The sub-job ID 1203 is information indicating an identifier of a corresponding sub-job.

The execution server ID 1204 is information for specifying an execution server which executes a corresponding sub-job.

The state 1205 (a sub-job state) is information indicating whether or not a result of a sub-job finishes normally. "normal" is set when a finish code of a sub-job in which divided data has been processed is less than a threshold value 1002, "abnormal" is set when the finish code is more than the threshold value, "execution-in-progress" is set when execution of a sub-job is in progress, and the column of the state is "blank" when a sub-job is not executed at all. The column of the job C for the divided data 2 is blank, and this indicates that, since the job B for the divided data 2 finishes abnormally, the job C for the divided data 2 using the job is not executed.

In addition, in a case where execution is performed from a leading sub-job in a job net at all times when re-execution is performed, since execution server information other than a sub-job which is executed last in the job net is not necessary, in FIG. 6, entries other than the sub-job executed last are not necessary. In addition, the job ID 1202 may be entered only when a sub-job state is "normal" without setting the state 1205.

<Execution Server Management Table>

FIG. 7 is a diagram illustrating a configuration example of the execution server management table 130. The execution server management table 130 includes entries corresponding to the number of execution servers, and has a server ID 1301, a server state 1302, and a multiplicity of vacancies 1303, as constituent items of each entry.

The server ID 1301 is information for specifying an execution server.

The server state 1302 is information indicating whether execution of a sub-job is in progress in a corresponding execution server, or in a "normal" state in which a sub-job can be input or in an "abnormal" state such as a server failure.

The multiplicity of vacancies 1303 is information indicating the number of sub-jobs which can be input to a corresponding execution server.

<Master Data Management Table>

FIG. 8 is information indicating a configuration example of the master data management table 140 which is provided for each master data item. Each master data management table 140 includes entries corresponding to the number of divided data items, and has a divided data ID 1401, a division key 1402, an update history 1403, and information 1404 indicating whether or not update has been performed as constituent items for each entry.

The divided data ID 1401 is identification information for specifying divided data obtained by dividing master data.

The division key 1402 is information indicating the unit for dividing the master data. For example, in a case where the master data has the name of a place of business or date information in each entry, information is collected in the name of a place of business or a time period, and this may be used as the division unit. A keyword or related information used at this time is a division key. In addition, the division key is not limited to a keyword or the like, and may be a division key for collecting master data with 1000 entry units. In a case where the division key is a keyword or the like, collected information pieces are relevant to each other, but in a case where collection is performed with the number of entries, information pieces are not necessarily relevant to each other.

The date and time where corresponding divided data is updated or the date and time when master data is initially divided is inserted into the update history 1403. In a case where master data has never been updated, the date and time when master data is divided is still set in a corresponding column of the update history 1403.

The information 10404 indicating whether or not update has been performed is information indicating whether or not corresponding divided data has been updated. For example, in a case of "non-updated", this indicates that corresponding divided data has not been updated since generated by dividing master data.

<Job Scheduling Process>

Figure 9:
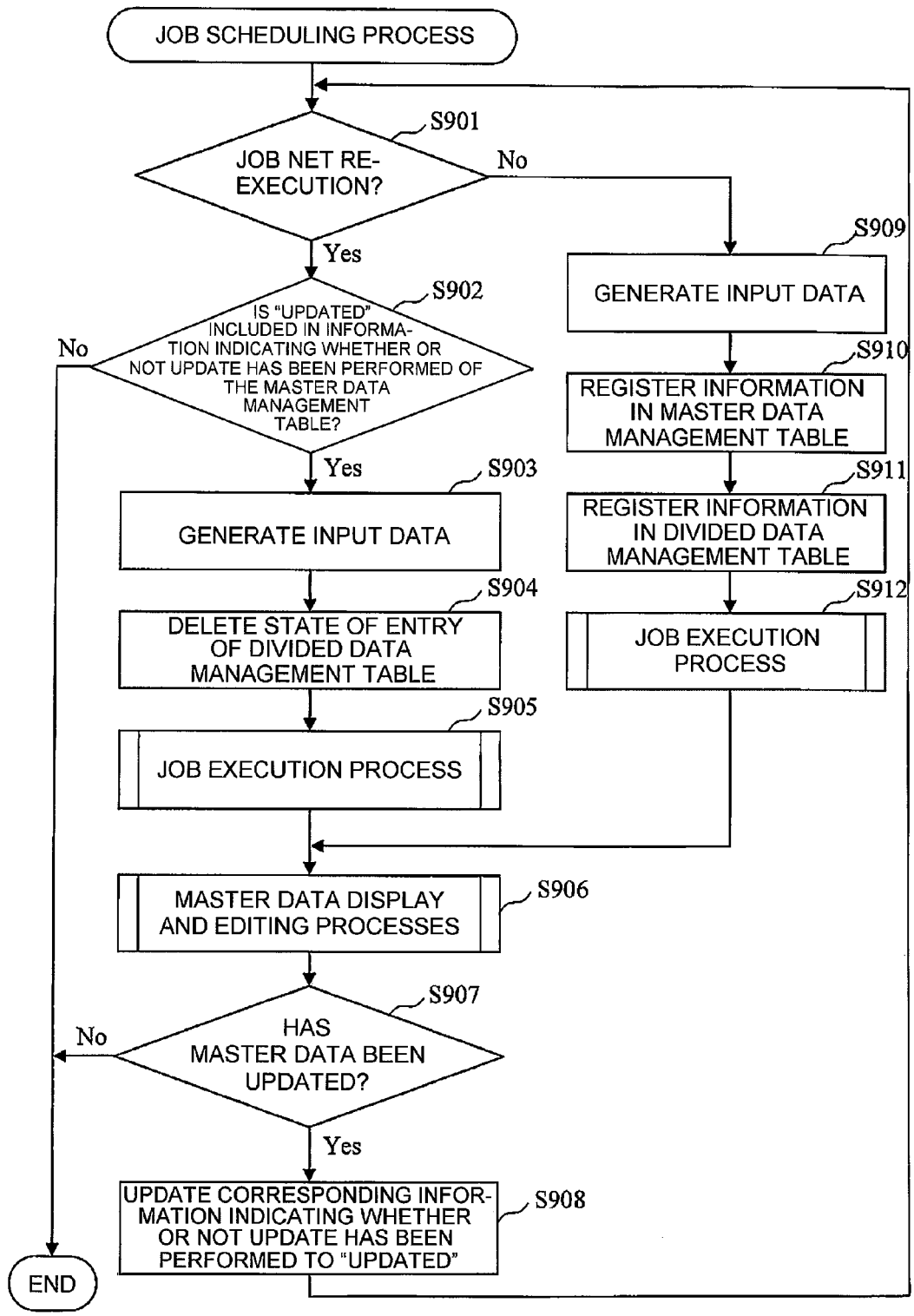
FIG. 9 is a flowchart illustrating content of a job scheduling process by a job scheduling process program 1000.

FIG. 9 is a flowchart illustrating content of a job scheduling process by the job scheduling process program 1000.

The job scheduling process program 1000 receives an instruction input from a user (manager or the like) and determines whether or not the instruction is an instruction for re-execution of a job net (step S901). The instruction input from the user includes, for example, designation of a file ID (for example, File 1) and an instruction for re-execution of a job net in a case of re-execution of the job net, and includes designation of a file ID, an instruction for execution of the job net, and designation of a division key and an execution server in a case of execution of the job net. If the input instruction is an instruction for re-execution of the job net (Yes in step S901), the process proceeds to step S902, and if the input instruction is an instruction for execution of the job net (No in step S901), the process proceeds to step S909.

In step S902, the job scheduling process program 1000 determines whether or not "updated" is included in the information 1404 indicating whether or not update has been performed of the master data management table (master data management information) 140. If "updated" is included in the information 1404 indicating whether or not update has been performed (Yes in step S902), the process proceeds to step S903, and if "updated" is not included (No in step S902), the process finishes. In addition, it may be determined that master data has been changed or corrected based on, for example, a file attribute (the date or the data size) in addition to the information 1404 indicating whether or not update has been performed. In addition, whether or not update has been performed may be determined by referring to an update history (log) indicating whether or not master data has been updated using an editor (for example, refer to FIG. 13B) for data correction. Further, whether or not update has been performed may be determined based on action information indicating whether or not a master data editing instruction button 1301 provided in a master data display screen (for example, FIG. 13A) is pressed. Furthermore, whether or not update has been performed may be determined by analyzing a history (log) of SQL, journal, or the like.

Next, the job scheduling process program 1000 divides master data in a corresponding execution server 20 using the division key 1402 in which the information 1404 indicating whether or not update has been performed includes "updated", obtained in step S902, and generates input data which is a target of job re-execution (step S903). For example, in a case where a state of the information 1404 indicating whether or not update has been performed is as shown in FIG. 8, the master data (File 1) is divided with the division key 1402 "bbbb" and thereby divided data 2 including an updated portion is generated.

In addition, the job scheduling process program 1000 changes (deletes) a state of an entry of the divided data management table 120 (step S904). In other words, the job scheduling process program 1000 deletes the state 1205 of an entry corresponding to an ID of the divided data which is created again in step S903 among the entries of the divided data management table (divided data management information) 120, thereby specifying a target of job re-execution. For example, in a case where a divided data ID "2" is updated, "normal" or "abnormal" which is the state 1205 in the entries 1206 (refer to FIG. 6) of which a divided data ID of the divided data management table 120 conforms to "2" is deleted, thereby setting the columns to be blank. In addition, a special flag indicating a target of a re-execution process may be set in addition to setting a blank column.

Successively, the job scheduling process program 1000 executes each job only on the divided data which is specified as a target of job re-execution in step S904 (step S905). Details of the job execution process will be described later.

In addition, the job scheduling process program 1000 calls the data editing/dividing/display process program 1100 so as to execute master data display and editing processes since the job is re-executed and thus a job result is different from a previous result (step S906). Details of the master data display and editing processes will be described later.

Next, the job scheduling process program 1000 determines whether or not the master data has been updated (data corresponding to a specific division key has been updated) (step S907). If the master data has been updated (Yes in step S907), the process proceeds to step S908. If the master data has not been updated (No in step S907), the process finishes.

In step S908, the job scheduling process program 1000 changes the information 1404 indicating whether or not update has been performed corresponding to the updated division key of the master data management table 140 from "non-updated" to "updated". If step S908 finishes, the process proceeds to step S901.

On the other hand, if it is determined that the input instruction is not an instruction for job net re-execution in step S901 (if typical job net execution is instructed), the job scheduling process program 1000 calls the data editing/dividing/display process program 1100. The called data editing/dividing/display process program 1100 divides the master data in the designated execution server using the designated division key, and generates input data with respect to the job net (step S909).

Next, the job scheduling process program 1000 enters necessary information to the master data management table 140. In other words, the job scheduling process program 1000 generates the master data management table (master data management information) 140, registers a division ID 1401 and a division key 1402 corresponding to each divided data item generated in step S909, registers the division date and time in the column of the update history 1403, and registers "non-updated" (assuming that update has not been performed at this time point) in the information 1404 indicating whether or not update has been performed (step S910).

In addition, the job scheduling process program 1000 registers necessary information in the divided data management table (divided data management information) 120 (step S911). In other words, the job scheduling process program 1000 enters a divided data ID 1201, a corresponding job ID 1202, a corresponding sub-job ID 1203 of the job net information management table (job net information) 100, and an execution server ID which executes each sub-job, in the divided data management table 120.

Next, the job scheduling process program 1000 sequentially executes corresponding jobs on respective divided data items (step S912). Details of the job execution process will be described later.

If the job execution process (step S912) finishes, the process proceeds to step S906.

<Job Execution Process>

Figure 10:
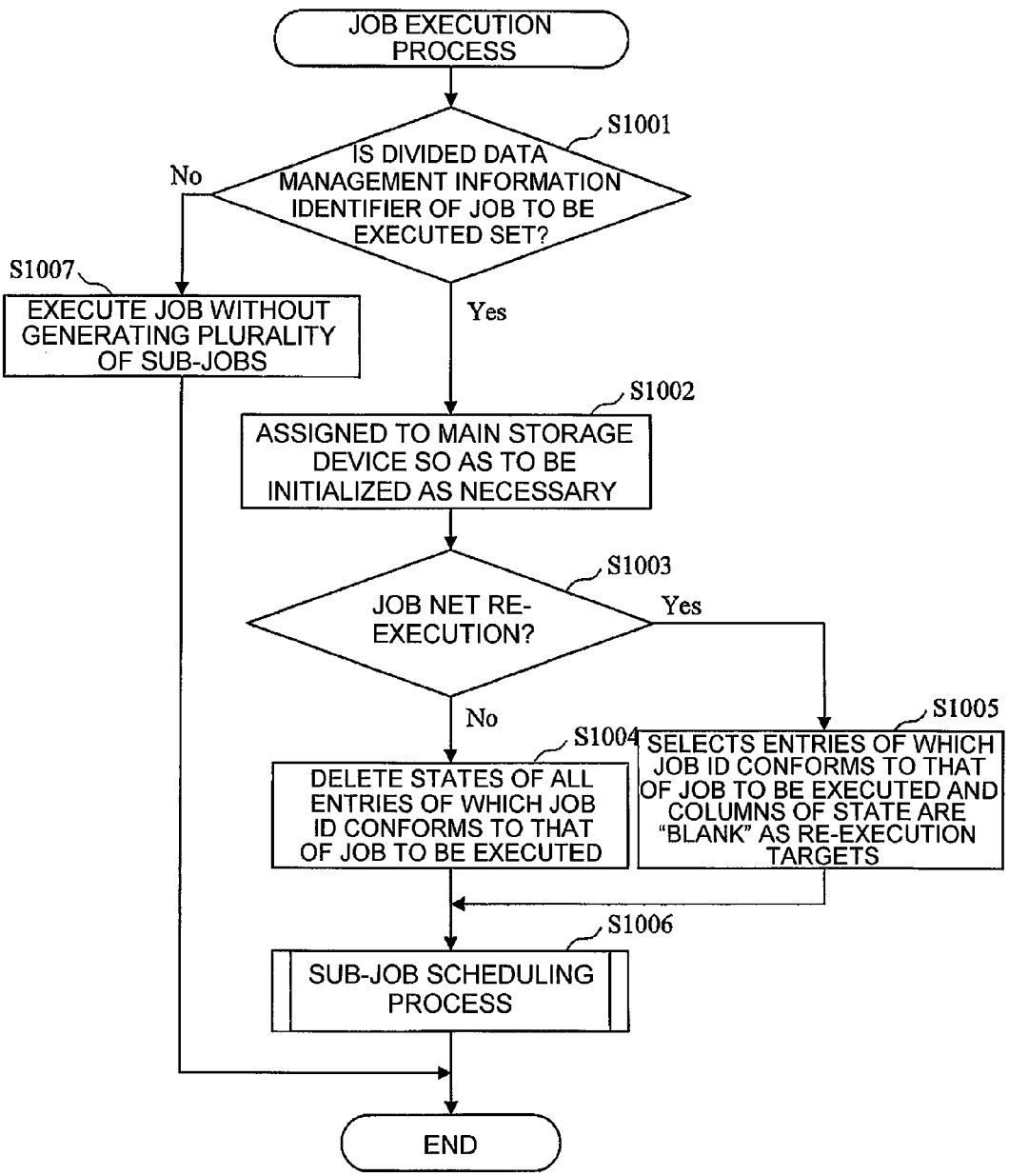
FIG. 10 is a flowchart illustrating details of a job execution process (steps 905 and 912).

FIG. 10 is a flowchart illustrating details of the job execution process (steps S905 and 912).

The job scheduling process program 1000 determines whether or not a divided data management information identifier 1003 corresponding to a job to be executed is set by referring to the job net information management table 100 (step S1001). If the divided data management information identifier 1001 is not set (No in step S1001), the process proceeds to step S1007. In this case, the job scheduling process program 1000 does not create a plurality of sub-jobs (does not divide the master data) and makes any execution server 20 execute a job according to the job net (step S1007).

On the other hand, if the divided data management information identifier 1001 is set (Yes in step S1001), the job scheduling process program 1000 assigns the divided data management information identifier to the main storage device 11 so as to be initialized when there is no divided data management table 120 corresponding to the divided data management information identifier 1001 (step S1002). In other words, the divided data management table 120 is completed in relation to the master data (for example, File 1) which is a job net execution target.

Next, the job scheduling process program 1000 determines whether or not a job to be executed is re-execution of the job net (step S1003). In other words, in a case where job net re-execution is instructed since the master data is updated, or in a case where job net re-execution is instructed from a user, the job net is executed on corresponding divided data. On the other hand, if typical job net execution is instructed, the job net is executed on each divided data item generated by dividing the master data. If the job net re-execution is instructed (Yes in step S1003), the process proceeds to step S1005. If the job net execution is instructed (No in step S1003), the process proceeds to step S1004.

In step S1004, the job scheduling process program 1000 deletes the states 1205 of all entries of which a job ID conforms to that of a job to be executed among entries of the divided data management table 120 corresponding to the divided data management information identifier 1003, and selects the entries as job execution targets.

On the other hand, in step S1005, the job scheduling process program 1000 selects entries of which a job ID conforms to that of a job to be executed and the columns of the state 1205 are blank among entries of the divided data management table 120 corresponding to the divided data management information identifier 1003. In addition, in a case of the job net re-execution, the state 1205 regarding divided data which is a re-execution target is blank in step S904.

Successively, the job scheduling process program 1000 instructs the sub-job execution control process program 2000 to execute a sub-job scheduling process (sub-job) of an execution server on the entries (divided data items) selected in step S1004 or step S1005. In addition, the sub-job execution control process program 2000 executes the sub-job scheduling process in response to this instruction (step S1006). In addition, which execution server executes a sub-job is selected in the sub-job scheduling process. The sub-job scheduling process including the selection of an execution server will be described later in detail.

<Sub-Job Scheduling Process>

Figure 11:
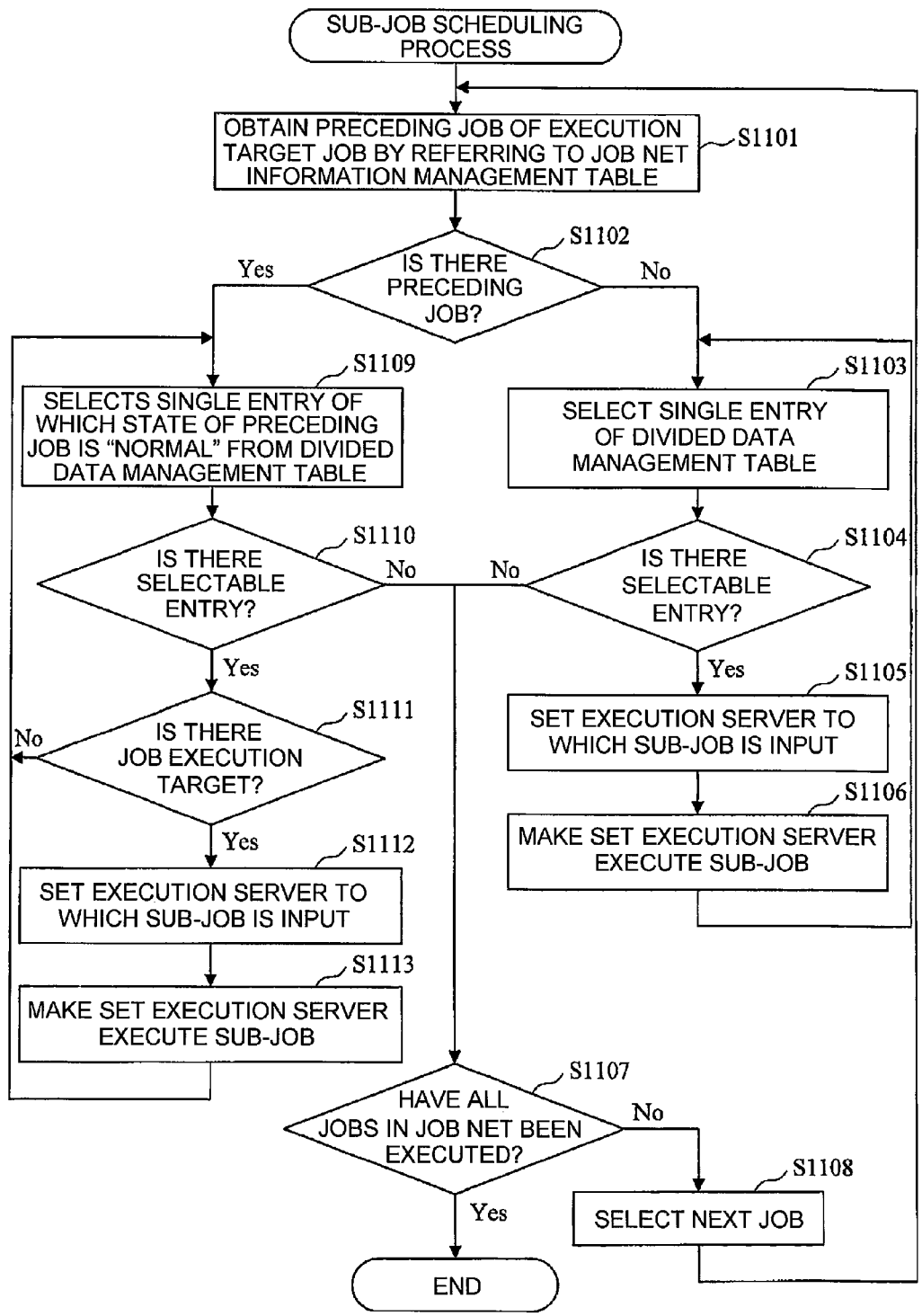
FIG. 11 is a flowchart illustrating details of a sub-job scheduling process (sub-job execution process).

FIG. 11 is a flowchart illustrating details of the sub-job scheduling process (sub-job execution process).

First, the job scheduling process program 1000 specifies a preceding job of an execution target job by referring to the job net information management table 100 (step S1101). For example, in a case where a job net is the job net 101 shown in FIG. 2, there is no preceding job if a target job is the job A, but in relation to the other jobs B to D, there are corresponding preceding jobs, respectively, and thus the corresponding jobs are specified.

In addition, the job scheduling process program 1000 determines whether or not there is a preceding job specified in step S1101 (step S1102). If there is a preceding job, the process proceeds to step S1109, and, if there is no preceding job, the process proceeds to step S1103.

In step S1103, the job scheduling process program 1000 selects a single divided data item (entry) which is an execution target from the divided data management table 120. In addition, in a case of the typical job net execution, the divided data items 1 to n are sequentially selected and processed from the divided data item 1. Further, in a case of the job net re-execution, a single divided data item is selected among target divided data items (divided data including an updated portion). In the job net re-execution, the number of target divided data items is one in most cases, and thus only a single divided data item is processed.

In addition, the job scheduling process program 1000 makes the process proceed to step S1107 if there is no selectable entry, and makes the process proceed to step S1105 if there is a selectable entry (step S1104).

Next, the job scheduling process program 1000 sets an execution server which will execute a sub-job on the divided data selected in step S1103 (step S1105). Specifically, when an execution server is set, the job scheduling process program 1000 refers to the execution server management table 130 and selects an any server 20 in which the multiplicity of vacancies 1303 is not "0". In a case where the multiplicity of vacancies is "0" in all the registered servers, the job scheduling process program waits until the multiplicity of vacancies 1303 becomes "1" or more in any server 20, and specifies an execution server after the multiplicity of vacancies becomes "1".

In addition, the job scheduling process program 1000 transmits a divided data ID or divided data which is a process target to the server 20 set in step S1105 so as to instruct to execute a sub-job. In a case where the execution server has master data, only a divided job ID may be transmitted; however, in a case where the execution server does not have master data, the divided data itself is transmitted to the execution server. The sub-job execution control process program 2000 of the server 20 which has received the instruction executes the sub-job on data corresponding to the received divided data ID. Since a leading job (for example, the job A) is executed in step S1106, the leading job is executed on the specified divided data in the set execution server 20.

If it is determined that there is no selectable entry in step S1104, the job scheduling process program 1000 determines whether or not all the jobs in the job net have been executed (step S1107). If all the jobs have been executed, the process finishes. If all the jobs have not been executed, the job scheduling process program 1000 selects the next job (if a job executed hitherto is the job A, the job B is selected) and makes the process proceed to step S1101 (step S1108).

On the other hand, if it is determined that there is a preceding job in step S1102, the job scheduling process program 1000 selects a single entry of which the state 1205 of a preceding job is "normal" from the divided data management table 120 (step S1109). In other words, this is because, since an execution result (intermediate data file) of a preceding job is used in a following job, the preceding job is required to finish normally.

In addition, the job scheduling process program 1000 makes the process proceed to step S1107 if there is no selectable entry, and makes the process proceed to step S1111 if there is a selectable entry (step S1110).

In step S1111, the job scheduling process program 1000 determines whether or not there is an execution target of the sub-job. Specifically, it is determined whether or not the state 1205 of divided data of which a divided data ID is the same as a divided data ID of the entry of the selected preceding job (for example, the job A) and a job ID conforms to a job ID (for example, the job B) of the execution target job is unset (blank). In other words, it is determined whether or not there is divided data on which a current job should be executed following the preceding job, and divided data which is a sub-job execution target is specified. If there is no sub-job target, the process proceeds to step S1109, and the next entry is processed. If it is determined that there is a sub-job execution target, the process proceeds to step S1112.

In step S1112, the job scheduling process program 1000 sets a server which will execute a sub-job on the divided data specified in step S1111. More specifically, the job scheduling process program 1000 refers to the execution server management table 130 and checks whether or not the multiplicity of vacancies of the execution server which has executed the preceding job is "1" or more. If the multiplicity of vacancies is 1 or more, the server which has executed the preceding job is set as an execution server. If the multiplicity of vacancies is "0", the job scheduling process program 1000 refers to the job management table 110 and checks whether or not the output file sharing information 1102 of the preceding job (for example, the job A) is set to "shared". If the output file sharing information is set to "shared", another server of which the multiplicity of vacancies is "1" or more is set as an execution server. In a case where the multiplicity of vacancies is "0" and the output file sharing information 1102 of the preceding job is set to "unshared", the job scheduling process program 1000 delays the process until the multiplicity of vacancies of the server which has executed the preceding job becomes "1" or more, and sets the server as an execution server at a time point when the multiplicity of vacancies becomes "1" or more.

Successively, the job scheduling process program 1000 transmits a divided data ID or divided data to the server 20 determined in step S1112 so as to instruct to execute a sub-job (step S1113). The sub-job execution control process program 2000 of the server 20 which has received the instruction executes the sub-job on data corresponding to the received divided data ID.

Further, if it is determined that there is no selectable entry in step S1110, the job scheduling process program 1000 determines whether or not all the jobs in the job net have been executed (step S1107). If all the jobs have been executed, the process finishes. If all the jobs have not been executed, the job scheduling process program 1000 selects the next job (if a job executed hitherto is the job B, the job C is selected) and makes the process proceed to step S1101 (step S1108).

<Master Data Display and Editing Processes>

Figure 12:
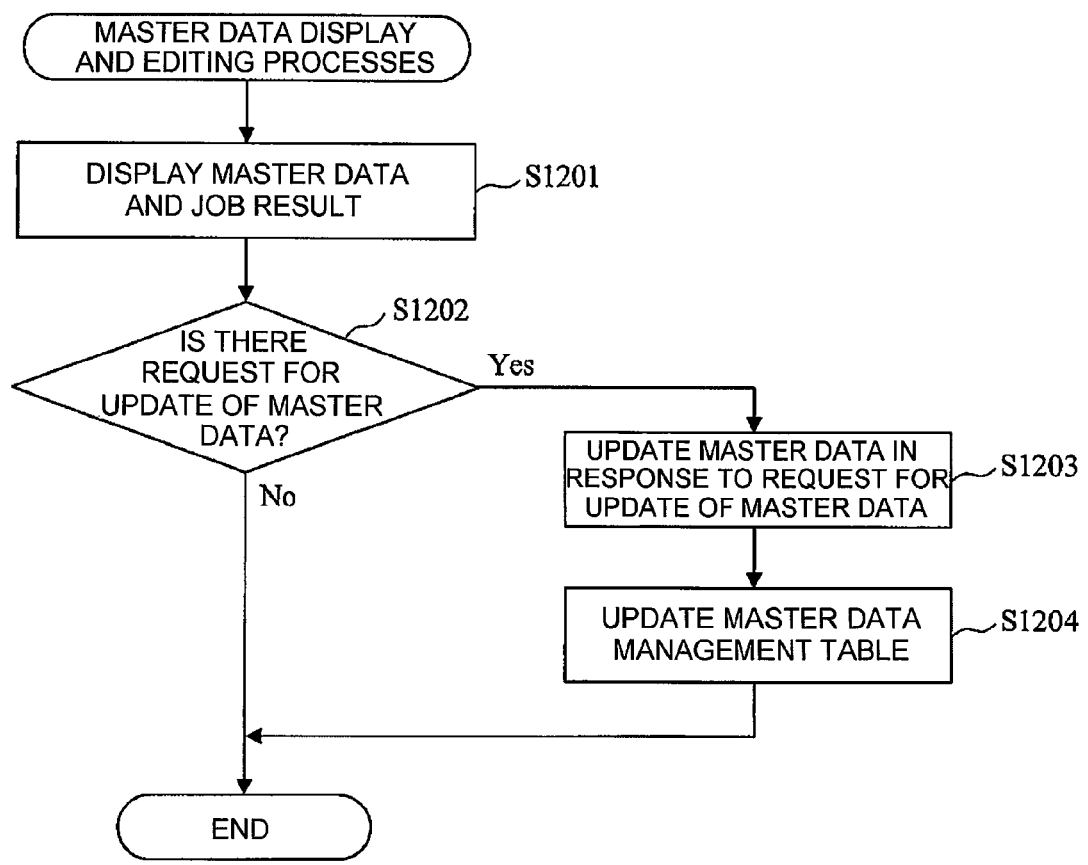
FIG. 12 is a flowchart illustrating details of master data display and editing processes.

FIG. 12 is a flowchart illustrating details of the master data display and editing processes. In addition, FIG. 13 is a diagram illustrating a master data display screen example and a master data editing screen example.

If the job execution process (step S905 or step S912) finishes, the job scheduling process program 1000 calls the data editing/dividing/display process program 1100 and displays the master data and a job result on a screen of a display device (not shown) (step S1201). For example, the data editing/dividing/display process program 1100 refers to the divided data management table 120 and the master data management table 140, and extracts therefrom the divided data ID 1401, the division key 1402, the update history 1403, the information 1404 indicating whether or not master data has been updated, the sub-job ID 1203, the execution server ID 1204, and the state 1205, which are displayed in a table form (refer to FIG. 13A).

In addition, the job scheduling process program 1000 determines whether or not there is a request for update of the master data (step S1202). If there is no request, the process finishes, and, if there is a request, the process proceeds to step S1203. In addition, whether or not there is a request for update of the master data is determined based on, for example, whether or not a master data editing button 1501 provided in the master data display screen (FIG. 13A) is pressed. If the master data editing button 1501 is pressed, the data editing/dividing/display process program 1100 displays a master data editing screen on the screen of the display device as shown in FIG. 13B.

In step S1203, the data editing/dividing/display process program 1100 changes (updates) the master data in response to an update input of the master data from the user (manager). The update of the master data is performed on the master data editing screen as shown in FIG. 13B.

In addition, the job scheduling process program 1000 updates the master data management table 140 in response to the update input in step S1203 (step S1204). In other words, the job scheduling process program 1000 specifies a division key corresponding to the updated master data from the updated history or the like, sets the information 1405 indicating whether or the master data is updated of the master data management table 140 to "updated", and enters the update date and time to the update history 1404.

Further, the master data display and editing processes may be executed in the flow of the job scheduling process of FIG. 9, or may display the master data display screen (FIG. 13A) at a current time point in response to an instruction from the user. In addition, if the user desires to, an editing process of the master data may be performed.

CONCLUSION

In the embodiment of the present invention, whether or not grid-batch is re-executed is determined based on whether or not master data has been updated. In order to realize it, update information of data is managed as management information of master data. In addition, if the update is completed, the master data is a re-execution target, and if the update is not completed, the master data is not a re-execution target. More specifically, when a job is executed on data division, if there is a job net re-execution request (a job net execution request when the master data is updated), whether or not update has been performed is determined from the master data management information, only master data corresponding to an updated division key is divided into data items, and a sub-job which is performed on corresponding divided data is updated to an abnormal state so as to be a re-execution target. In this way, in a case where master data is desired to be partially updated and re-executed regardless of normal and abnormal sub-job states, only a specific sub-job can be re-executed.

In addition, after the job is executed, the divided data management information and the master data management information are displayed, and, further, the master data editing screen is activated so as to update master data. Further, a division key corresponding to the updated location is specified from this update history, and the information indicating whether or not update has been performed in the master data management information is updated to "updated". Also in this case, a job (sub-job) is executed only on divided data including the updated portion. In this way, a sub-job can be immediately executed so as to handle an update process of master data which is voluntarily performed by a user, and thereby it is possible to suppress a risk of exceeding a regulated estimated finish time.

In addition, the present invention is not limited to the embodiment itself, and may be embodied by modifying the constituent elements in the scope without departing from the spirit thereof in an implementation stage. Further, various inventions may be made through appropriate combinations of a plurality of constituent elements disclosed in the embodiment. For example, some constituent elements may be deleted from all the constituent elements shown in the embodiment. Furthermore, a constituent element extending over another embodiment may be appropriately combined.

In addition, each configuration, function, processing unit, processing means, and the like shown in the embodiment may be realized in hardware, for example, by designing some or all of them using integrated circuits. Further, each configuration, function, and the like may be realized in software by a processor analyzing and executing a program for realizing each function. Information such as a program, a table, or a file for realizing each function may be stored in a recording or storage device such as a memory, a hard disk, a Solid State Drive (SSD), or a recording or storage medium such as an IC card, an SD card, or a DVD.

In addition, the above-described embodiment, the control lines or the information lines which are considered to be necessary for the description are shown, and thus it cannot be necessarily said that all control lines or information lines in a product are shown. All the constituent elements may be connected to each other.

REFERENCE SIGNS LIST

1 COMPUTER SYSTEM, 2 NETWORK, 10 SCHEDULING SERVER (MANAGEMENT COMPUTER), 20 EXECUTION SERVER (JOB EXECUTION COMPUTER), 15 STORAGE DEVICE OF SCHEDULING SERVER SIDE, 25 STORAGE DEVICE OF EXECUTION SERVER SIDE, 100 JOB NET INFORMATION MANAGEMENT TABLE, 110 JOB INFORMATION MANAGEMENT TABLE, 120 DIVIDED DATA MANAGEMENT TABLE, 130 EXECUTION SERVER MANAGEMENT TABLE, 140 MASTER DATA MANAGEMENT TABLE, 1000 JOB SCHEDULING PROCESS PROGRAM, 2000 SUB-JOB EXECUTION CONTROL PROCESS PROGRAM

The invention claimed is:

1. A computer system comprising:
a plurality of job execution computers that execute a job net as a series of one or more jobs;
a management computer that generates a plurality of divided data items by dividing master data using one or more division keys indicating units for dividing the master data, and sets the job execution computers to process each of the plurality of divided data items so as to execute the jobs as one or more sub-jobs; and
at least one storage device that stores at least the master data and execution results of the one or more sub-jobs,
wherein the management computer manages, determines and updates update related information regarding whether or not the master data has been updated, where the update related information includes a file attribute which indicates that the master data has been changed and a file size of the master data, and manages updated division key information which is one of the division keys corresponding to an updated portion of the master data,
vacancies information indicating whether or not there is a capacity for executing one or more of the sub-jobs in each of the plurality of job execution computers, and
output file sharing information indicating whether or not execution results of the one or more sub-jobs are shared between the plurality of job execution computers, and
wherein the management computer is configured to:
when receiving a re-execution request, specify one of the divided data items corresponding to the updated division key information from the plurality of divided data items and which is updated after or during the execution of the one or more sub-jobs,
specify one of the sub-jobs corresponding to the specified divided data item,
when the vacancies information of a first one of the job execution computers which executed a preceding one of the sub-jobs to the specified one of the sub-jobs indicates that there is insufficient capacity for executing the specified one of the sub-jobs as a following sub-job, refer to the output file sharing information, and set a second one of the job execution computers to execute the following sub-job based on whether the execution result of the preceding one of the sub-jobs is shared with the job execution computers.

2. The computer system according to claim 1, wherein, when the vacancies information of the first one of the job execution computers which executed the preceding sub-job to the specified one of the sub-jobs indicates that there is capacity for executing the specified one of the sub-jobs, the first one of the job execution computers is set to execute the specified one of the sub-jobs.

3. The computer system according to claim 1, wherein, when the execution result of the preceding sub-job cannot be used by the second one of the job execution computers, the management computer delays the setting of the second one of the job execution computers until the first one of the job execution computers which has executed the preceding sub-job has the capacity to execute the specified one of the sub-jobs.

4. The computer system according to claim 1, wherein the management computer determines whether or not the master data has been updated using the file attribute.

5. The computer system according to claim 1, wherein the update related information is update history information indicating a history in which the master data has been changed, and
wherein the management computer determines whether or not the master data has been updated using the update history information.

6. The computer system according to claim 1, wherein the update related information is user action information indicating whether or not a master data editing button provided in a master data display screen for displaying content of the master data has been pressed, and
wherein the management computer determines that the master data has been updated when there is the user action information.

7. The computer system according to claim 1, wherein the management computer displays management information of the master data and an execution result of the one or more sub-jobs on a display screen of a display device after the one or more sub-jobs are executed.

8. The computer system according to claim 7, wherein the management computer displays the management information of the master data and the execution result of the one or more sub-jobs on the display screen of the display device in response to a request from a user.

9. The computer system according to claim 7, wherein, in response to an instruction from a user, the management computer displays an editing screen for editing the master data on the display screen, receives an update of the master data, and reflects whether or not the update has been performed on the management information of the master data.

10. A job execution management method in a computer system including a plurality of job execution computers executing a job net as a series of one or more jobs, and a management computer, the job execution management method performed by the management computer comprising:
generating a plurality of divided data items by dividing master data using one or more division keys indicating units for dividing the master data;
setting the job execution computers to process each of the plurality of divided data items so as to execute the jobs as one or more sub-jobs;
managing, determining and updating update related information regarding whether or not a master data has been updated, where the update related information includes a file attribute which indicates that the master data has been changed and a file size of the master data, and updated division key information which is one of the division keys corresponding to an updated portion of the master data;
managing vacancies information indicating whether or not there is a capacity for executing one or more of the sub-jobs in each of the plurality of job execution computers;
managing output file sharing information indicating whether or not execution results of the one or more sub-jobs are shared between the plurality of job execution computers;
when receiving a re-execution request, specifying one of the divided data items corresponding to the updated division key information from the plurality of divided data items and which is updated after or during the execution of the one or more sub-jobs;
specifying one of the sub-jobs corresponding to the specified divided data item;
when the vacancies information of a first one of the job execution computers which executed a preceding one of the sub-jobs to the specified one of the sub-jobs indicates that there is insufficient capacity for executing the specified one of the sub-jobs as a following sub-job, referring to the output file sharing information; and
setting a second one of the job execution computers to execute the following sub-job based on whether the execution result of the preceding one of the sub-jobs is shared with the job execution computers.

11. The job execution management method according to claim 10, further comprising:
displaying management information of the master data and an execution result of the one or more sub-jobs on a display screen of a display device after the one or more sub-jobs are executed.

12. The job execution management method according to claim 11, further comprising:
displaying, in response to an instruction from a user, an editing screen for editing the master data on the display screen;
receiving an update of the master data; and
reflecting whether or not the update has been performed on the management information of the master data.

13. The job execution management method according to claim 10,
wherein, when the vacancies information of the first one of the job execution computers which executed the preceding sub-job to the specified one of the sub-jobs indicates that there is capacity for executing the specified one of the sub-jobs, setting the first one of the job execution computers to execute the specified one of the sub-jobs.

14. A non-transitory computer-readable medium having instructions stored thereon that, when executed by a management computer, cause the management computer to perform a job execution management method in a computer system including a plurality of job execution computers executing a job net as a series of one or more jobs, the job execution management method performed by the management computer comprising:
generating a plurality of divided data items by dividing master data using one or more division keys indicating units for dividing the master data;

setting the job execution computers to process each of the plurality of divided data items so as to execute the jobs as one or more sub-jobs;

managing, determining and updating update related information regarding whether or not a master data has been updated, where the update related information includes a file attribute which indicates that the master data has been changed and a file size of the master data, and updated division key information which is one of the division keys corresponding to an updated portion of the master data;

managing vacancies information indicating whether or not there is a capacity for executing one or more of the sub-jobs in each of the plurality of job execution computers;

managing output file sharing information indicating whether or not execution results of the one or more sub-jobs are shared between the plurality of job execution computers;

when receiving a re-execution request, specifying one of the divided data items corresponding to the updated division key information from the plurality of divided data items and which is updated after or during the execution of the one or more sub-jobs;

specifying one of the sub-jobs corresponding to the specified divided data item;

when the vacancies information of a first one of the job execution computers which executed a preceding one of the sub-jobs to the specified one of the sub-jobs indicates that there is insufficient capacity for executing the specified one of the sub-jobs as a following sub-job, referring to the output file sharing information; and setting a second one of the job execution computers to execute the following sub-job based on whether the execution result of the preceding one of the sub-jobs is shared with the job execution computers.

15. The computer system according to claim 1,
wherein the management computer sets the second one of the job execution computers to execute the following sub-job based on whether the execution result of the preceding one of the sub-jobs is shared with the job execution computers and whether the vacancies information of the job execution computers other than the first one indicates there is the capacity to execute the following sub-job in at least one of the job execution computers other than the first one.

16. The computer system according to claim 1,
wherein the output file sharing information indicating whether or not each of the execution results of the one or more sub-jobs is shared between the plurality of job execution computers.

17. The computer system according to claim 1,
wherein the output file sharing information indicates which of the execution results are accessible on the at least one storage device to each of the job execution computers.

\* \* \* \* \*